March 16, 1954

C. E. MORPHEW 2,672,117

INDICATING MECHANISM

Filed March 28, 1951

Inventor
Clarence E. Morphew

By Willits, Helmig & Baillio
Attorneys

Patented Mar. 16, 1954

2,672,117

UNITED STATES PATENT OFFICE 2,672,117

INDICATING MECHANISM

Clarence E. Morphew, Detroit, Mich., assignor to General Motors Corporation, Detroit, Mich., a corporation of Delaware Application March 28, 1951, Serial No. 217,998

5 Claims. (Cl. 116—124)

The present invention relates to illuminated indicia dials and particularly to dials of this type adapted for use in connection with automotive vehicle transmission control devices.

Automotive vehicles employing automatic transmissions have an indicia dial mounted on the steering column thereof adjacent to the steering wheel to indicate the different positions of adjustment of the associated transmission shift lever. It often occurs that the operator of the vehicle is unable to observe the indicated position of the transmission shift lever because of poor light and this at times might cause the said operator considerable inconvenience. This is especially true in case of night driving or while the vehicle is parked in a dark or poorly lighted garage.

One object of the present invention is to provide a novel and highly improved illuminated dial which may be clearly observed regardless of lighting conditions.

Another object is to provide an indicia dial of the stated character for indicating the different positions of adjustment of the shift lever associated with an automatic transmission of a motor vehicle.

A more specific object is to provide a light conducting dial having indicia thereon, a source of light remote from said dial, means for conducting light from said source to said dial and pointer means associated with said dial.

Other and further objects will become apparent as the description of the invention progresses.

Of the drawing—

Figure 1:
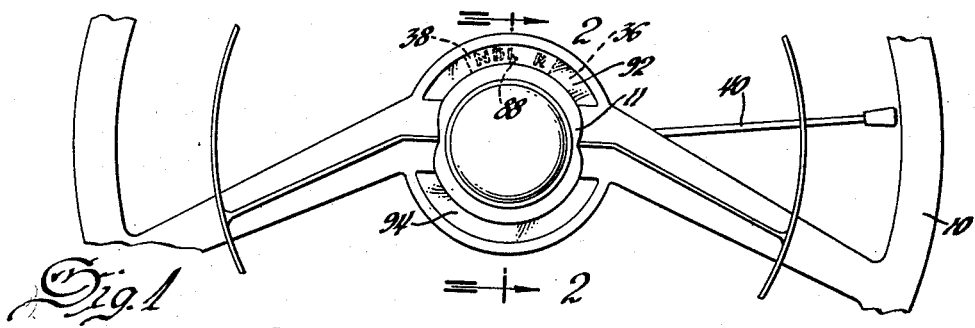
Fig. 1 is a fragmentary plan view of a steering wheel and horn ring, showing an indicia dial, an associated pointer and a transmission shift lever.

Referring to the drawing, the numeral 10 indicates a vehicle steering wheel secured in the usual fashion to the upper end of a steering shaft 12. A horn ring 11 is mounted on steering wheel 10 so as to move therewith during steering operations. Shaft 12 is mounted for rotation in a ball bearing 14 mounted near the upper end of a bracket 16 which, in turn, is secured by bolts 18 or other suitable means to the upper end of the steering column 20. The bracket 16 has secured to the upper end 22 thereof a supporting member 24 having an outer annular housing flange 26. Secured to the upper surface of member 24 near the flange 26 is an inverted cup-shaped support 28 having an enlarged opening 30 therein through which shaft 12 and the lower end of the hub 32 of steering wheel 10 extend. Secured to the upper surface of support 28 in any suitable manner is an annular dial member 36. Dial 36 may be constructed of any suitable transparent material such, for example, as a thermoplastic methyl-methacrylate resin commonly known as "Lucite," and is provided with a reduced portion 38 having the letters N, D, L and R provided thereon designating, respectively, the neutral, drive, low and reverse positions of the shift lever 40 of an automatic transmission. It is to be understood, however, that other indicia may be placed on dial 36, if it is so desired, without departing from the invention.

Shift lever 40 is secured to a carrier 42 therefor comprising a hub 44 operatively connected to an annular flange 46 disposed beneath and in alignment with the flange 26 of supporting member 24. The member (not shown) connecting the annular flange 46 to the hub 44 and also the inner end of shift lever 40 connected thereto extend through an opening 47 provided in steering column 20. Carrier 42 is supported for turning movement about its axis by engagement of the internally threaded upper end 48 thereof with the externally threaded lower end 50 of bracket 16. Hub 44 has secured interiorly thereof in any suitable manner the upper end of a transmission control tube 52, the lower end of which being operatively connected to the transmission (not shown). Thus upon actuation of lever 40, the transmission may be adjusted to its different positions as indicated on dial 36.

Except to the extent described herein, the specific construction of the carrier 50, the shift lever 40 and its specific connecting means to carrier 50, and the tube 52 and its connections with the transmission form no part of the present invention and therefore they will not be described in detail herein. For a complete disclosure of such mechanism reference may be had to the application of William L. Reid and David A. Galonska, Serial No. 100,006, filed on June 18, 1949, for Transmission. Suffice it to say that upon actuation of lever 40 the carrier 50 and control tube 52 will be moved about their common axis to the different positions indicated on dial 36.

Carrier 46 is provided at one side thereof with an inset portion 56 forming a chamber 58 in which is supported an electrical fixture 60 having an incandescent lamp 62 operatively connected to the socket 63 thereof. A cover 64 secured to the inset portion 56 by machine screws 66 closes the outer side of chamber 58 and permits ready access to said chamber. The inner wall 68 of inset portion 56 is of arcuate construction and conforms with the curvature of fixture 60. Wall 68 has provided near the lower end thereof a groove 70 which receives the annular rib 72 of fixture 60 thereby holding the latter against vertical displacement. Inwardly extending ribs 74 and 76 on cover 64 having arcuate recesses therein conforming to the curvature of fixture 60 engage the latter and with inner wall 68 hold the said fixture against lateral movement. The fixture 60 is connected to the battery of the vehicle (not shown) or to any other suitable source of electric potential by a conductor 78.

Figure 2:
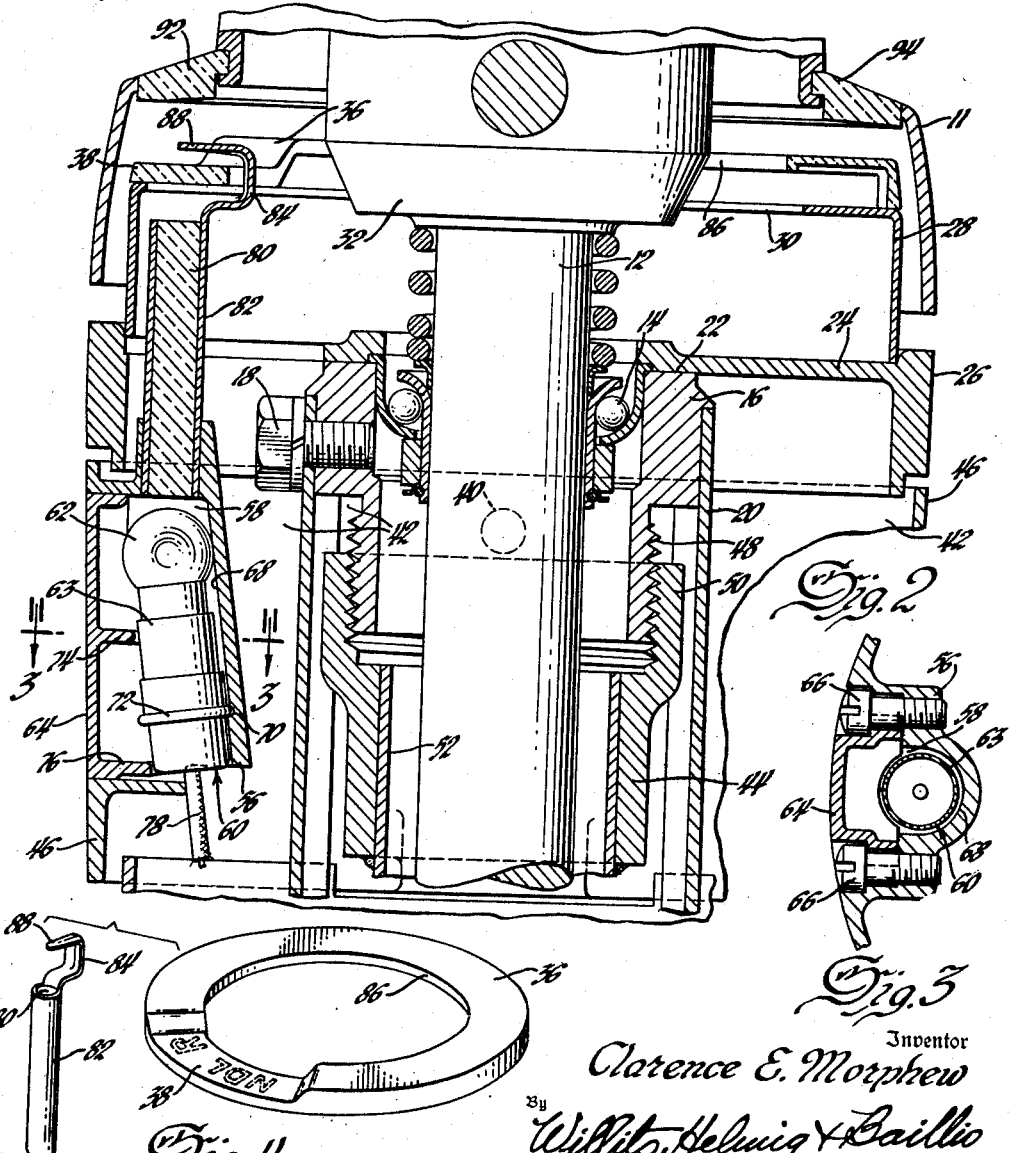
Fig. 2 is a longitudinal sectional view taken substantially along line 2—2 of Fig. 1.
Figure 3:
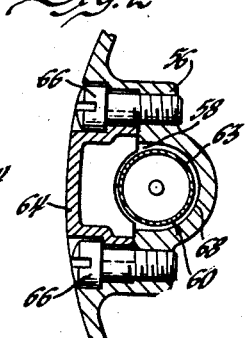
Fig. 3 is a sectional view taken substantially along line 3—3 of Fig. 2.
Figure 4:
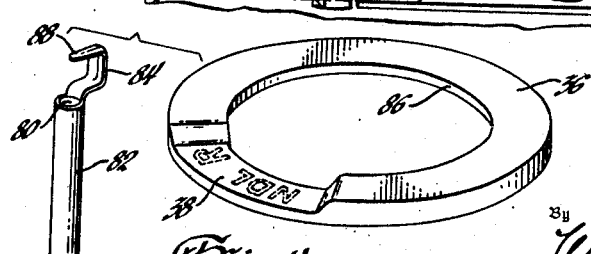
Fig. 4 is a collective perspective view of the indicia dial, and the pointer and the light conductive means associated with said dial.

Light from incandescent lamp 62 is conducted to the dial 36 by a relatively long rod 80 which may be constructed of a thermoplastic of the acrylic polymer resin type commonly known as "Plexiglas" or of the previously referred to plastic known as "Lucite" or of any other suitable transparent material. Rod 80 is mounted within a cylindrical metallic or other suitable casing 82 which in turn is rigidly secured to the upper apertured end of inset portion 56. Casing 82 is open at both ends and has a substantially U-shaped extension 84 extending upwardly from the inner side thereof, which, as shown in Fig. 2, extends upwardly through openings 30 and 86 provided in support 28 and dial 36, respectively. The upper leg 88 of extension 84 constitutes the pointer of the device and overlies part of the inner surface of the reduced portion of dial 36. The pointer 88 thus clearly indicates the different positions of adjustment of shift lever 40. When the light is inadequate, however, incandescent lamp 62 is lighted by any suitable switch means (not shown) and the light therefrom is conducted to the dial 36 to indicate the different positions of shift lever 40.

The interior of tubular casing 82 is painted white or other good light reflecting color for reflecting the light rays from lamp 62 to dial 36. The tubular casing 82 is adapted to effectively transmit light from lamp 62 to the dial 36 without the use of rod 80, and, accordingly the said rod 80 may be omitted if it is so desired. Whether the rod 80 is employed or omitted only an area of the dial 36 slightly larger than that of any of the indicium thereon will be illuminated. Consequently, only the indicium indicating the position of the shift lever 40 will stand out prominently. This eliminates confusion and greatly aids the driver in the operation of the vehicle.

As shown more clearly in Figs. 1 and 2 the horn ring 11 mounted at the top of the steering wheel structure forms a housing for dial 36. Windows 92 and 94 are provided in horn ring 11 which enable the driver to observe the dial. The horn ring 11 together with supporting member 24 and annular flanges 26 and 46 protect the dial 36 and associated parts from dust or accidental damage.

From the foregoing description it is seen that a simplified and highly effective illuminated dial structure has been provided. The pointer along with the light indicator afford a plurality of indicating means which enable the driver to most effectively observe the dial under all lighting conditions. It is also seen that all of the parts of the device are enclosed within suitable housings so as to be protected against dust and accidental damage.

While the embodiment shown and described herein is admirably adapted to fulfill the objects primarily stated, it is to be understood that it is not intended to limit the invention thereto since it might be embodied in other forms, all coming within the scope of the claims which follow.

What is claimed is:

1. An indicator comprising a member having a translucent dial portion with a plurality of indicia disposed thereon, light concentrating means disposed on one side of said dial to selectively illuminate one of said indicia, indicating means mounted in fixed relation thereto said light concentrating means and having a pointer disposed on the opposite side of said dial to register with said illuminated indicia, said means and said dial portion being relatively movable with respect to each other.

2. An indicator comprising a member having a translucent dial portion with a plurality of indicia disposed thereon, illuminating means comprising a light transmitting tube having one end thereof positioned adjacent said light and having the other end thereof disposed adjacent one side of said dial portion to illuminate one of said indicia, indicating means comprising an elongated member mounted in fixed relation thereto said tube and having a pointer thereon disposed on the opposite side of said portion in substantial alignment with said tube to register with said illuminated indicia, said means and said translucent dial portion being relatively movable with respect to each other.

3. An indicator adapted to be mounted on the steering column of a vehicle to be actuated by a transmission control lever for indicating the operating condition of the vehicle transmission, said indicator comprising a member having an arcuate translucent dial portion with a plurality of indicia thereon, a lamp and a light concentrating tube movably disposed on one side of said member, one end of said tube being positioned adjacent said dial portion to register with and illuminate one of said indicia, a pointer mounted on said tube for movement therewith, said pointer having one end thereof disposed on the opposite side of said dial portion to register with said illuminated indicia.

4. In a vehicle having a transmission control lever mounted on a steering column, a transmission indicator comprising a member disposed on said steering column and having a translucent dial portion with a plurality of transmission indicia disposed thereon, indicating means mounted on said steering column to register with one of said indicia, said means including light concentrating means operatively disposed on one side of said translucent portion to individually illuminate one indicia and a pointer mounted on said light concentrating means and having one end thereof disposed on the opposite side of said portion to register with said illuminated indicia, said means and said portion being relatively movable with respect to each other.

5. In a vehicle having a transmission control lever mounted on the steering column adjacent the steering wheel, a transmission indicator mounted on said steering column to be visible through an annular transparent window in said steering wheel, a member mounted on said steering column and having a translucent dial portion with a plurality of transmission indicia disposed thereon to register with said window, indicated means movably disposed on said steering column to be actuated by movement of said lever to selectively register with one of said indicia, said means including a source of illumination and a light transmitting member operatively disposed between said source and one side of said dial portion to concentrate a beam of light on said portion and individually illuminate one of said indicia, and a pointer mounted on said light transmitting member for movement therewith and having one end thereof disposed on the opposite side of said dial portion in substantial alignment with said light transmitting member to register with said illuminated indicia.

CLARENCE E. MORPHEW.

References Cited in the file of this patent

UNITED STATES PATENTS

| Number | Name | Date |
|---|---|---|
| 2,071,284 | Hyland | Feb. 16, 1937 |
| 2,081,827 | Lohl | May 25, 1937 |
| 2,108,342 | Le Fevre | Feb. 15, 1938 |
| 2,328,485 | Ott | Aug. 31, 1943 |

FOREIGN PATENTS

| Number | Country | Date |
|---|---|---|
| 419,305 | Great Britain | Nov. 9, 1934 |